US009268861B2

(12) United States Patent
Bordino et al.

(10) Patent No.: US 9,268,861 B2
(45) Date of Patent: Feb. 23, 2016

(54) METHOD AND SYSTEM FOR RECOMMENDING RELEVANT WEB CONTENT TO SECOND SCREEN APPLICATION USERS

(71) Applicant: Yahoo! Inc., Sunnyvale, CA (US)

(72) Inventors: Ilaria Bordino, Barcelona (ES); Gianmarco De Francisci Morales, Barcelona (ES); Francesco Bonchi, Barcelona (ES)

(73) Assignee: Yahoo! Inc., Sunnyvale, CA (US)

( * ) Notice: Subject to any disclaimer, the term of this patent is extended or adjusted under 35 U.S.C. 154(b) by 191 days.

(21) Appl. No.: 13/969,920

(22) Filed: Aug. 19, 2013

(65) Prior Publication Data

US 2015/0052126 A1 Feb. 19, 2015

(51) Int. Cl.
*G06F 17/30* (2006.01)

(52) U.S. Cl.
CPC ............................. *G06F 17/30867* (2013.01)

(58) Field of Classification Search
CPC ....................................................... G06F 17/30
USPC ................................................. 707/600–899
See application file for complete search history.

(56) References Cited

U.S. PATENT DOCUMENTS

| 6,903,779 | B2 | 6/2005 | Dyer |
| 7,739,596 | B2 | 6/2010 | Clarke-Martin et al. |
| 7,900,145 | B2 | 3/2011 | Blinnikka |
| 8,060,509 | B2 | 11/2011 | deVries et al. |
| 8,219,911 | B2 | 7/2012 | Clarke-Martin et al. |
| 2008/0111822 | A1 | 5/2008 | Horowitz et al. |
| 2008/0126387 | A1 | 5/2008 | Blinnikka |
| 2008/0172293 | A1 | 7/2008 | Raskin et al. |
| 2008/0249986 | A1 | 10/2008 | Clarke-Martin et al. |
| 2008/0281689 | A1 | 11/2008 | Blinnikka et al. |
| 2009/0164904 | A1 | 6/2009 | Horowitz et al. |
| 2012/0207447 | A1 | 8/2012 | deVries et al. |
| 2012/0209843 | A1 | 8/2012 | deVries et al. |
| 2012/0239496 | A1 | 9/2012 | Clarke-Martin et al. |
| 2013/0007057 | A1* | 1/2013 | Li et al. .................... 707/769 |

OTHER PUBLICATIONS

T. Brants, F. Chen, and A. Farahat. A system for new event detection. In Proceedings of the 26th annual international ACM SIGIR conference on Research and development in informaion retrieval, SIGIR '03, pp. 330-337. ACM, 2003.
C. Buckley and E. M. Voorhees. Retrieval evaluation with incomplete information. In Proceedings of the 27th annual international ACM SIGIR conference on Research and development in information retrieval, SIGIR '04, pp. 25-32. ACM, 2004.

(Continued)

*Primary Examiner* — Isaac M Woo
(74) *Attorney, Agent, or Firm* — James J. DeCarlo; Greenberg Traurig, LLP (57) ABSTRACT

Disclosed is a system and method for recommending web content to a second screen. A server computer analyzes closed captioning text associated with a media program being experienced in a time period by a user having a client device. In response to the analyzing of the closed captioning text, the server automatically extracts an entity from the closed captioning text and determines an online web page describing the entity. The server utilizes a graph model to retrieve a relevant information item for the entity, where the graph model includes a plurality of entity nodes and a plurality of query nodes. The server communicates, within the time period, the relevant information item to the client device.

19 Claims, 6 Drawing Sheets

(56) References Cited

OTHER PUBLICATIONS

G. Kumaran and J. Allan. Text classification and named entities for new event detection. In Proceedings of the 27th annual international ACM SIGIR conference on Research and development in information retrieval, SIGIR '04, pp. 297-304. ACM, 2004.

M. Morita and Y. Shinoda. Information Filtering based on user behavior analysis and best match text retrieval. In Proceedings of the 17th annual international ACM SIGIR conference on Research and development in information retrieval, SIGIR '94, pp. 272-281. Springer-Verlag New York, Inc., 1994.

Y. Yang, T. Pierce, and J. Carbonell. A study of retrospective and on-line event detection. In Proceedings of the 21st annual international ACM SIGIR conference on Research and development in information retrieval, SIGIR '98, pp. 28-36. ACM, 1998.

F. Y. Y. Choi. Advances in domain independent lineart ext segmentation. In Proceedings of the 1st North American chapter of the Association for Computational Linguistics conference, NAACL 2000, pp. 26-33. Association for Computational Linguistics, 2000.

N. J. Belkin and W. B. Croft. Information filtering and information retrieval: two sides of the same coin? Commun. ACM, 35(12):29-38, 1992.

R. Blanco, H. Halpin, D. M. Herzig, P. Mika, J. Pound, H. S. Thompson, and T. Tran Duo. Repeatable and reliable search system evaluation using crowdsourcing. In Proceedings of the 34th international ACM SIGIR conference on Research and development in Information Retrieval, SIGIR '11, pp. 923-932. ACM, 2011.

G. De Francisci Morales, A. Gionis, and C. Lucchese. From Chatter to Headlines: Harnessing the Real-Time Web for Personalized News Recommendation. In WSDM '12: 5th ACM International Conference on Web Search and Data Mining, pp. 153-162. ACM Press, 2012.

I. Soboro and D. Harman. Novelty detection: the TREC experience. In Proceedings of the conference on Human Language Technology and Empirical Methods in Natural Language Processing, HLT '05, pp. 105-112. Association for Computational Linguistics, 2005.

A. G. Hauptmann. Story segmentation and detection of commercials. In in Broadcast News Video, Advances in Digital Libraries Conference, p. 24, 1998.

D. A. Hull, J. O. Pedersen, and H. Schutze. Method combination for document filtering. In Proceedings of the 19th annual international ACM SIGIR conference on Research and development in information retrieval, SIGIR '96, pp. 279-287. ACM, 1996.

N. J. Belkin and W. B. Croft. Information filtering and information retrieval: two sides of the same coin? Commun. ACM, 35(12)29-38, 1992.

M. Matthews, P. Tolchinsky, P. Mika, R. Blanco, and H. Zaragoza. Searching through time in the New York Times Categories and Subject Descriptors. Information Retrieval, 2010.

D. Beeferman, A. Berger, and J. Lafferty. Statistical models for text segmentation. Mach. Learn., 34(1-3):177-210, 1999.

T. A. H. Bell and A. Moffat. The design of a high performance information filtering system. In Proceedings of the 19th annual international ACM SIGIR conference on Research and development in information retrieval, SIGIR '96, pp. 12-20. ACM, 1996.

J. Allan, R. Papka, and V. Lavrenko. On-line new event detection and tracking. In Proceedings of the 21st annual international ACM SIGIR conference on Research and development in information retrieval, SIGIR '98, pp. 37-45. ACM, 1998.

T. Sakai. Alternatives to bpref. In W. Kraaij, A. P. de Vries, C. L. A. Clarke, N. Fuhr, and N. Kando, editors, SIGIR 2007: Proceedings of the 30th Annual International ACM SIGIR Conference on Research and Development in Information Retrieval, Amsterdam, The Netherlands, Jul. 23-27, 2007, pp. 71-78. ACM, 2007.

A. Farahat, F. Chen, and T. Brants. Optimizing story link detection is not equivalent to optimizing new event detection. In Proceedings of the 41st Annual Meeting on Association for Computational Linguistics—vol. 1, ACL '03, pp. 232-239. Association for Computational Linguistics, 2003.

R. Papka. On-line New Event Detection, Clustering, and Tracking. Ph.d. thesys at CIIR, University of Massachusetts, 1999.

M. T. S. Robertson, H. Zaragoza H. Simple BM25 extension to multiple weighted fields. In CIKM '04: Proceedings of the thirteenth ACM international conference on Information and knowledge management, pp. 42-49, New York, NY, USA, 2004. ACM.

D. W. Oard. The state of the art in text filtering. User Modeling and User-Adapted Interaction, 7(3):141-178, 1997.

M. Henzinger, B. Milch, B-W Chang and S. Brin. Query-free news search, WWW2003, ACM, May 20-24, 2003, Budapest, Hungary.

J. Allan, editor. Topic detection and tracking: event-based information organization. Kluwer Academic Publishers, 2002.

P.J. Denning. Electronic junk. Commun. ACM, 25(3): 163-165, 1982.

H.P. Luhn. A business intelligence system. IBM Journal of Research and Development, 2(4):314-319, 1958. ISSN 0018-8646.

D. Osman, J. Yearwood, and P. Vamplew. Automated opinion detection: Implications of the level of agreement between human raters. Inf. Process. Manage., 46(3):331-342, 2010.

C. Tryfonopoulos, M. Koubarakis and Y. Drougas. Information filtering and query indexing for an information retrieval model. ACM Trans. Inf. Syst., 27(2):10:1-10:47, 2009.

I.Bordino, G. De Francisci Morales and F. Bonchi. Extracting entities from closed captions to recommend relevant information for TV content. In Proceedings of the sixth ACM international conference on Web search and data mining (WSDM '13). ACM, New York, NY, USA, 275-284, Feb. 4-8, 2013.

P. Boldi, F. Bonchi, C. Castillo, D. Donato, A. Gionis, and S. Vigna. The query-flow graph: model and applications. In CIKM, pp. 609-618, 2008.

P. Boldi, F. Bonchi, C. Castillo, and S. Vigna. From 'dango' to 'japanese cakes': Query reformulation models and patterns. In Proc. WI'09. IEEE CS Press, 2009.

F. Bonchi, R. Perego, F. Silvestri, H. Vahabi, and R. Venturini. E cient query recommendations in the long tail via center-piece subgraphs. In SIGIR, page to appear, 2012.

I. Bordino, G. De Francisci Morales, I. Weber, and F. Bonchi. From machu picchu to rafting the urubamba river: Anticipating information needs via the entity-query graph. In WSDM, 2013.

J. Hoffart, M. A. Yosef, I. Bordino, H. Furstenau, M. Pinkal, M. Spaniol, B. Taneva, S. Thater, and G. Weikum. Robust disambiguation of named entities in text. In EMNLP, pp. 782{792, 2011.

S. Kulkarni, A. Singh, G. Ramakrishnan, and S. Chakrabarti. Collective annotation of Wikipedia entities in web text. In KDD, pp. 457-466, 2009.

G. Malewicz, M. H. Austern, A. J. C. Bik, J. C. Dehnert, I. Horn, N. Leiser, and G. Czajkowski. Pregel: A System for Large-Scale Graph Processing. In SIGMOD, pp. 135-145, 2010.

R. Mihalcea and A. Csomai. Wikify!: linking documents to encyclopedic knowledge. In CIKM, pp. 233-242, 2007.

D. Milne and I. H. Witten. Learning to link with Wikipedia. In CIKM, pp. 509-518, 2008.

M. Yazdani and Popescu-Belis Using a Wikipedia-based Semantic Relatedness Measure for Document Clustering. In TextGgraphs, pp. 29-36, 2011.

Y. Zhou, L. Nie, O. Rouhani-Kalleh, F. Vasile, and S. Ganey. Resolving surface forms to Wikipedia topics. In COLING, pp. 1335-1343, 2010.

\* cited by examiner

METHOD AND SYSTEM FOR RECOMMENDING RELEVANT WEB CONTENT TO SECOND SCREEN APPLICATION USERS

FIELD

The present disclosure relates to media programs, and more specifically to recommending relevant web content to second screen application users.

BACKGROUND

Watching television programs or other media programs is typically an enjoyable way to spend one's time. Recently, a new breed of applications for mobile devices (e.g., smartphones and tablets) have enhanced the television watching experience. These software applications (often referred to as "apps") may provide information related to the television program being watched, such as information about the actors and actresses in the program, information about the music being played in the television program, etc. These apps may also display comments or messages from other users who are watching the same television program and may allow you to respond to these messages or post your own message(s). IntoNow®, from Yahoo!®, Inc. is one such mobile device app.

SUMMARY

The present disclosure relates to a system, method, and computer readable storage medium for recommending web content to a second screen.

In one aspect, a server computer analyzes closed captioning text associated with a media program being experienced in a time period by a user having a client device. In response to the analyzing of the closed captioning text, the server automatically extracts (e.g., in real-time or near real-time) an entity from the closed captioning text. The server determines an online web page describing the entity. The server utilizes a graph model to retrieve a relevant information item for the entity, where the graph model includes a plurality of entity nodes and a plurality of query nodes. The server communicates, within the time period, the relevant information item to the client device.

In one embodiment, the server determines a set of topics relating to the closed captioning text. The relevant information can include, for example, search queries, factoids, curiosities, quotes, facts, and questions and answers. In one embodiment, the server segments the closed captioning text into a series of segments. Segments of consecutive lines in the closed captioning text that define a theme in the text can be identified.

In one embodiment, the server uses a windowing approach to identify the segments, such as a sliding window approach or a tumbling window approach. In one embodiment, the server utilizes a graph representation of a query log as the graph model. The graph model can include, for example, nodes and arcs, where the nodes include Wikipedia entity nodes and query nodes and the arcs include entity-entity arcs, query-query arcs, and/or entity-query arcs.

In one aspect, a computing device includes a processor and a storage medium for tangibly storing thereon program logic for execution by the processor. The program logic includes graph modeling logic executed by the processor for generating a graph model, where the graph model includes a plurality of nodes and a plurality of arcs. Each node in the plurality is an entity node representing an entity or a query node representing a query in a query log. Each arc is an entity-entity arc, a query-query arc, or an entity-query arc. The query-query arc is positioned between two query nodes and indicates that the two represented queries are likely to be part of a same search session or mission. The entity-entity arc is positioned between two entity nodes and indicates query-flow transitions related to the two represented entities. The entity-query arc is positioned between an entity node and a query node and indicates a relationship between the represented query and the represented entity.

In one embodiment, the program logic includes recommendation logic executed by the processor for recommending queries for a closed captioning segment. In one embodiment, the program logic includes computation logic executed by the processor for performing Personalized PageRank computations on the graph model.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present disclosure is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
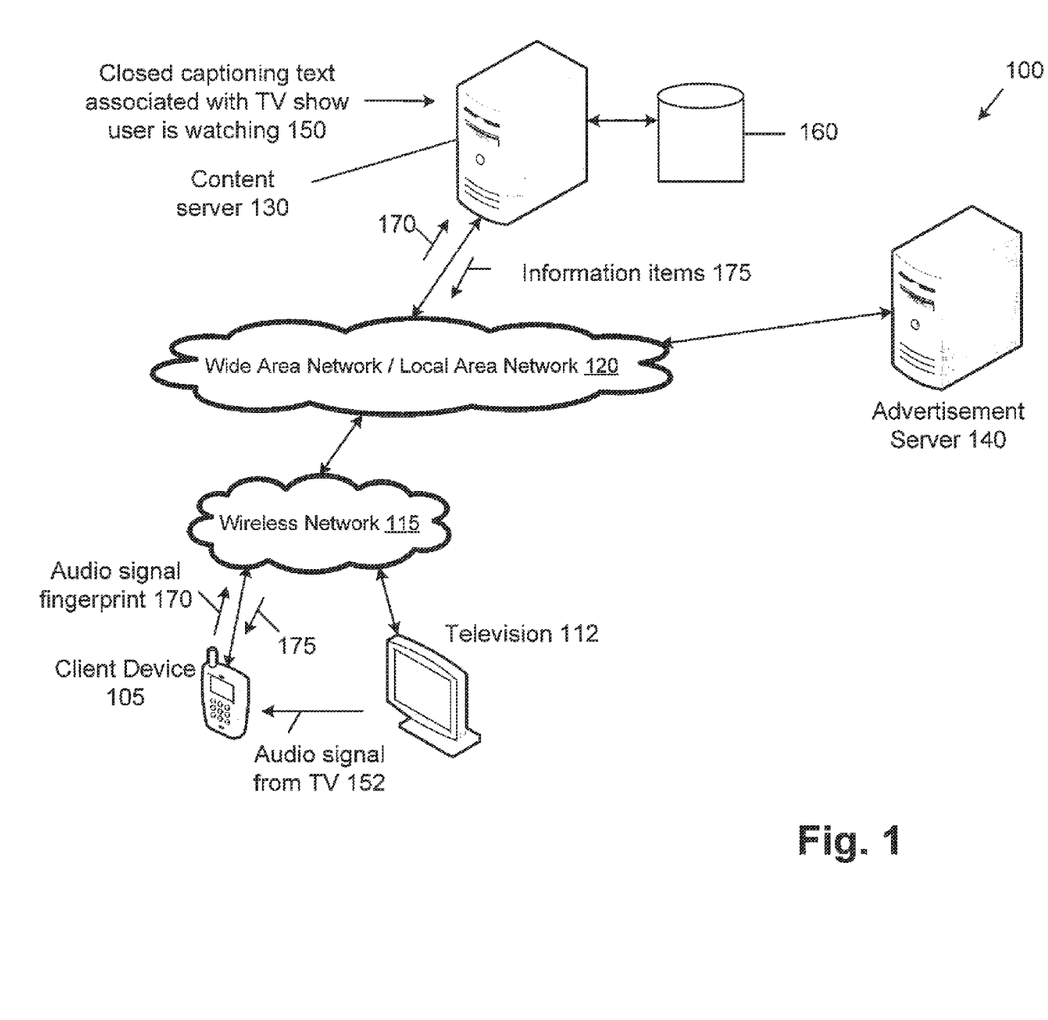
FIG. 1 is a schematic diagram illustrating an example system of a network and devices implementing embodiments of the present disclosure.

FIG. 1 is a schematic diagram illustrating an example system 100 of a network and devices implementing embodiments of the present disclosure. Other embodiments that may vary, for example, in terms of arrangement or in terms of type of components, are also intended to be included within claimed subject matter. FIG. 1 includes, for example, a client device 105 in communication with a content server 130 over a wireless network 115 connected to a local area network (LAN)/wide area network (WAN) 120, such as the Internet. Content server 130 is also referred to below as server computer 130 or server 130. In one embodiment, the client device 105 is also in communication with an advertisement server 140. Although shown as a wireless network 115 and WAN/LAN 120, the client device 105 can communicate with servers 130, 140 via any type of network.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Examples of devices that may operate as a content server include desktop computers, multiprocessor systems, microprocessor-type or programmable consumer electronics, etc. Content server 130 may provide a variety of services that include, but are not limited to, web services, third-party services, audio services, video services, email services, instant messaging (IM) services, SMS services, MMS services, FTP services, voice over IP (VOIP) services, calendaring services, photo services, social media services, or the like. Examples of content may include text, images, audio, video, or the like, which may be processed in the form of physical signals, such as electrical signals, for example, or may be stored in memory, as physical states, for example. In one embodiment, the content server 130 hosts or is in communication with a database 160.

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LIE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

In one embodiment and as described herein, the client device 105 is a smartphone. In another embodiment, the client device 105 is a tablet. The client device 105 is, in one embodiment, in the same room as a television 112 (or other media player). Further, in another embodiment, the client device 105 is included in the television 112 itself (e.g., a smart TV), is a computer, a computer monitor, a radio, an iPod®, etc. Certain embodiments disclosed herein relate to the concept of "second screen" viewing, which is intended to describe the viewing of an item of media on one device while generally simultaneously interacting with another smart device that has "knowledge" of the media item being viewed.

Suppose a user of the client device 105 turns on the television 112 and begins experiencing (e.g., watching, listening to) a media program played on the television 112. In one embodiment, the server computer 130 obtains the closed captioning text 150 associated with the media program. This closed captioning text may be obtained via a broadcast by the television network(s). In another embodiment, the server computer 130 has previously received the closed captioning text and has stored the closed captioning text (e.g., in database 160 or other art recognized storage methodology), such as for example if the media program is a rerun and the closed captioning text was previously broadcasted by the network and/or received by the server 130. The media program may be, for example, a news program.

In one embodiment, the client device 105 anticipates information needs of the user that may arise while watching television 112 by providing information items 175 that are relevant for the content being shown. For example, when a user finds something interesting or unclear in the media program she is watching on television 112, she might want to obtain additional information by, for example, searching the Web. However, the client device 105 typically has a small screen and limited capabilities, and therefore it may be difficult to type on the client device 105 or to spend a lot of time searching on the client device 105 (such as, for example, when watching television). Thus, in one embodiment, the client device 105 automatically suggests content to the user related to the media program being watched.

Figure 2:
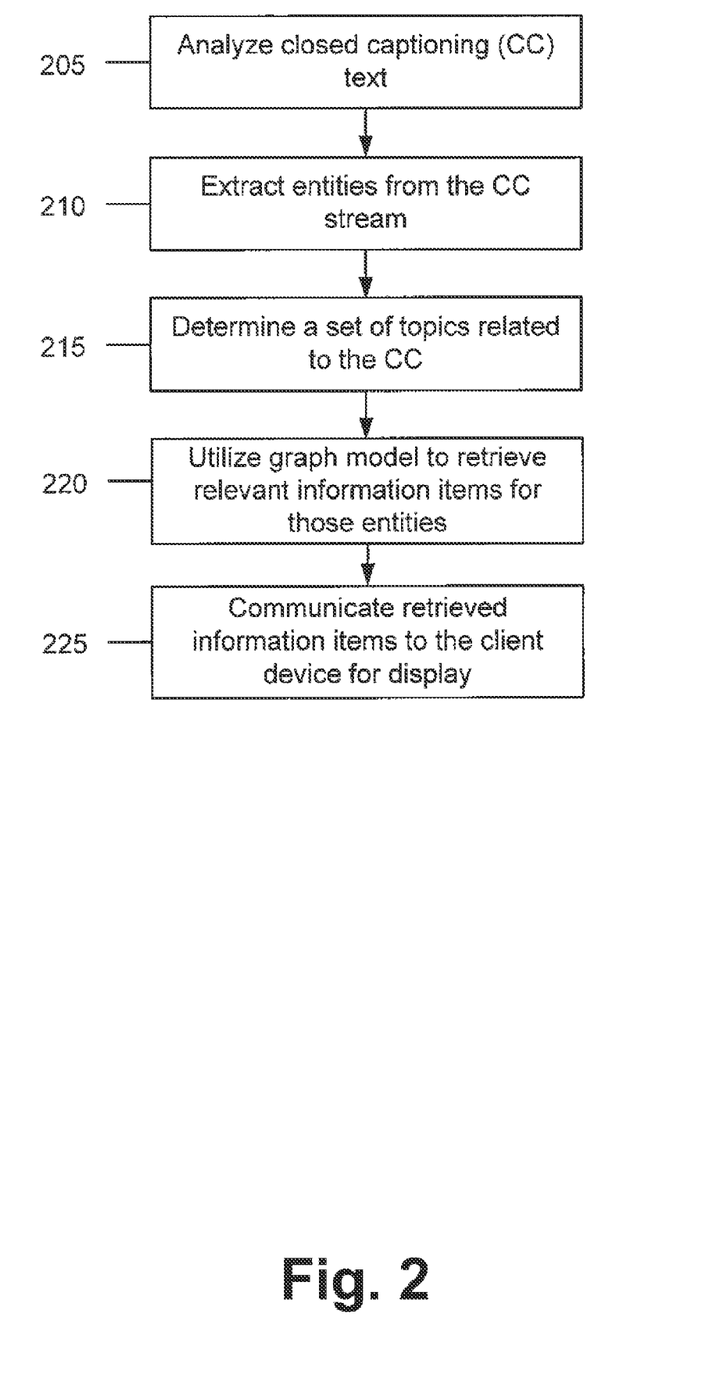
FIG. 2 is a flowchart illustrating steps performed by a server computer to provide information items related to content associated with closed captioning text in accordance with an embodiment of the present disclosure.

Although described below as the server 130 performing the described steps, in another embodiment all or some of the described steps are performed by the client device 105. Referring to FIG. 2, the server 130 analyzes the closed captioning text associated with the media program (Step 205). Thus, in one embodiment, in order to analyze the TV content, closed captions (CC) broadcasted along with the TV program are used as its textual representation. Although the text in the CC may be noisy, may lack proper capitalization, and may contain typographical errors and misspellings, the server 130 models the CC stream as a series of contiguous segments, each matching a single cohesive topic.

The server 130 automatically (e.g., in real-time or near real-time) extracts entities (e.g., people, places, and/or organizations) from the CC stream (Step 210). As used herein, the term "real-time" or "real time" means without perceivable delay or information that is delivered immediately after collection or processing. These terms also include a time delay (e.g., milliseconds or less) introduced by automated processing (e.g., near real-time).

In one embodiment, the server 130 determines the set of topics to which the CC text is related (Step 215). In one embodiment, the server 130 determines the set of topics via automatic keyword extraction and word sense disambiguation. Automatic keyword extraction identifies the sentences in the input text that capture the relevant concepts discussed in the text. Word sense disambiguation determines the correct interpretation of any such sentence, thus linking it to the actual concept it represents. In one embodiment, the server 130 performs the sense disambiguation task by linking phrases extracted from a CC segment to Wikipedia articles. An entity as used herein is any concept (e.g., person, place, and/or event) that is defined and described in an online knowledge-based web site or page, such as in a Wikipedia page.

In one embodiment, the server 130 determines an online web page describing the entity. The server 130 then utilizes a graph model to retrieve relevant information items for those entities (Step 220). The server 130 transmits the retrieved information item(s) 175 to the client device 105 for display to the user (Step 225). Various kinds of information can be extracted and presented to the user, such as, for example:

1. Related search queries: In one embodiment, the "wisdom of the crowd" contained in search-engine query logs is utilized by the server 130 to automatically suggest to the user web queries which are related to the entities extracted from the closed captions. A query log stores information about the search actions of the users of a search engine. The basic record stored in a query log L is a tuple $<q_i, u_i, t_i, V_i, C_i>$ where: $q_i$ is the submitted query, $u_i$ is an anonymized identifier for the user who submitted the query, $t_i$ is a timestamp, $V_i$ is the set of documents returned as results to the query, and $C_i$ is the set of documents clicked by the user. In one embodiment, the server 130 does not take into account information from the results of queries ($V_i$ and $C_i$). A user query session, or session, is defined as a sequence of queries of one particular user issued within a given threshold from each other (e.g., typically 30 minutes). A chain or logical session, or mission, is a sequence of queries in the same session that are topically coherent.

2. "Did you know?": In one embodiment, the server 130 presents factoids/curiosities/fun facts/quotes (from a knowledge base) related to the entities extracted from the closed captions.

3. Leverage Answers: Another possibility is to link the user to questions and answers stored in database 160 (e.g., Yahoo! Answers) that the user can read or reply to.

In one embodiment and as described below, search queries are the items that are recommended. In one embodiment, the server 130 segments the stream of closed captions into a series of contiguous and semantically coherent segments. The server 130 can segment the stream of closed captions by applying windowed techniques that exploit heuristics based on timestamps, punctuation or other special markers, to detect pauses or change of speakers in the stream. In one embodiment, given a segment representing a cohesive theme, its concepts can be represented by the set of Wikipedia entities extracted from the stream.

In one embodiment, to retrieve recommendations for the obtained set of entities, the server 130 (e.g., graph modeling logic) utilizes or generates a graph model, referred to herein as an "Entity-Query graph". In one embodiment, the Entity-Query graph (also referred to herein as the EQGraph) extends the known Query-Flow graph. The Query-Flow graph is a graph representation of a query log aimed at capturing interesting knowledge about the latent querying behavior of the users, with special focus on the sequentiality of similar queries. The nodes of the Query-Flow graph are the queries in the query log $\mathcal{L}$, and an arc between two queries indicates that the two queries are likely to be part of the same search session or mission, in the order given by the direction of the arc.

The Entity-Query graph, as described in more detail below, can include, e.g., two distinct sets of nodes: Wikipedia entity nodes and query nodes. The Entity-Query graph can include, e.g., three different sets of arcs: entity-entity, query-query, and entity-query. The query-query connections are akin to their counterpart in the Query-Flow graph: the presence of a directed arc between two query nodes indicates a sufficiently high likelihood of submitting the second query after having issued the first query. In the EQGraph, each entity is connected to the queries that contain it. In one embodiment, the entity-entity transitions are equivalent to query-flow transitions at the conceptual level of entities. In one embodiment, these entity-entity transitions are derived from the query-flow transitions by aggregating transitions that are related to the same entities.

The server 130 (e.g., recommendation logic) leverages the EQGraph to recommend queries for a closed-caption segment. In one embodiment and as described in more detail below, the server 130 starts from the seed set of entities contained in the text. To ensure that the seed set contains a sufficiently large number of concepts, in one embodiment the initial set of entities is expanded by performing Personalized PageRank computations in the subgraph of the EQGraph induced by the entity nodes. The server 130 (e.g., computation logic) performs the Personalized PageRank computations.

In the EQGraph, the entities of interest for a text are connected to the queries that contain them. In one embodiment, the server 130 (e.g., computation logic) performs a second Personalized PageRank computation for the expanded set of entities in the full EQGraph to obtain final query recommendations.

In one embodiment, a textual representation of the entities is used to provide synthetically generated queries. In another embodiment, real queries are used to leverage the wisdom of the crowd. Queries that are pointed by multiple entities are more likely to be interesting because they are at the intersection of different topics in a text. The EQGraph captures this intuition—if two entities are related, there will likely be a query that is pointed by both entities.

The EQGraph can be large, and running Personalized PageRank computations on large graphs is potentially a serious performance bottleneck of the query recommendation method. To perform these computations in an efficient and scalable manner, in one embodiment the server 130 uses a Hadoop-based framework for running graph algorithms on large-scale data in parallel by distributing the load on many computers to implement the Personalized PageRank algorithm.

For example, suppose a user is watching a news program on the CBS Network® and also has his smartphone. In one embodiment, the user activates the IntoNow® app provided by Yahoo!®. In one embodiment, the IntoNow® app receives an audio signal 152 from television 112. The client device 105, (using the IntoNow® app, or another application or group of applications capable of performing the functions described herein) utilizes fingerprinting technology to determine which television program is playing on the television 112 from the audio signal 152. In one embodiment, the client device 105 transmits an audio signal fingerprint 170 to the server computer 130. The server computer 130 compares this audio signal fingerprint 170 to fingerprints in the database 160 to determine the television program being displayed on the television 112. Of course, other forms of program identification can be used, by way of non-limiting example through data exchange with a set-top box, or a smart video device like a networked television, reading program metadata, matching time and channel data to a program guide, or the like.

Once the television program is determined, the server 130 can obtain the closed captioning text associated with the program. The server 130 may have this closed captioning text already stored in its database or may obtain the closed captioning text from the subject's broadcast program. In another embodiment, the server 130 utilizes voice to text software to analyze the audio signal 152 and determine text associated with the media program.

By way of non-limiting example, suppose a news program is currently being broadcast and contains a weather report, delivered by an announcer, indicating that it is snowing in Washington, D.C. and the snow is expected to continue throughout the night. The server 130 analyzes the closed captioning text to determine this subject matter. In one embodiment, the server 130 obtains a subject matter of a portion of a media program by identifying topics or segments of consecutive lines in the closed captioning text that define a cohesive theme in the text. In one embodiment and as described in more detail below, a sliding window scheme is used to identify the topics.

The server 130 can then extract entities from the CC text. The server 130 uses the entities to determine relevant information items associated with the CC text. By way of non-limiting example, the entity may be "Snowing in Washington, D.C." The server 130 uses this entity to determine one or more online knowledge-based web site or page describing this entity. The server 130 then utilizes a graph model to retrieve relevant information items for those entities. The server 130 transmits the retrieved information to the client device 105 for display to the user. For example, the relevant information may be a news article describing the snow storm hitting Washington, D.C. In one embodiment, the server 130 determines, for example, that the time period between the determination that the media program is discussing the snow storm on television and the retrieval of this news article is 2 seconds. The server 130 may utilize a parameter corresponding to an acceptable amount of elapsed time between the obtaining of the subject matter from the closed captioning text and the delivering of a relevant information. This parameter may be set to a default value or may be configurable by a user. If the elapsed time period is less than the threshold amount of elapsed time, the server 130 communicates information related to the content to the client device 105.

The EQ Graph Model

In more detail, the EQGraph extends the Query-Flow graph with nodes representing Wikipedia entities, and with arcs between entities, as well as from entities to queries. More formally, the EQGraph is a directed graph G=(N,A) whose nodes and arcs are defined as follows. Let Q denote all the queries appearing in a query log L, and E all the entities extracted from the text of such queries. The set of nodes N contains a node for every entity e∈E, and for every query q∈Q. Specifically, $N_E$ denotes the set of entity nodes, and by $N_Q$ the set of query nodes. Thus $N=N_E \cup N_Q$. The set of arcs A is given by the union of three different sets of arcs: $A_E$, $A_Q$, and $A_{EQ}$.

Query-to-query transitions. Arcs in $A_Q$ connect query nodes, and they have exactly the same semantic as in the original Query-Flow graph model. An arc $q_i \rightarrow q_j \in A_Q$, with $q_i, q_j \in N_Q$, indicates that the two queries $q_i$ and $q_j$ are likely to be part of the same search mission.

Arc $q_i \rightarrow q_j$ is assigned a weight $w_Q(q_i \rightarrow q_j)$ representing the chaining probability that a user issues query $q_j$ consecutively after $q_i$ in a same search mission. The chaining probability of any transition $q_i \rightarrow q_j$ is computed by extracting temporal, syntactic and session features that aggregate information from all the sessions where $q_i$ and $q_j$ appear consecutively, and in the given order. In one embodiment, arcs whose chaining probability is lower than a minimum threshold are discarded, because they represent noisy reformulations that are not likely to be made within a given search mission.

The subgraph ($N_Q$, $A_Q$) is actually a Query-Flow graph. In one embodiment, the settings of a Query-Flow graph is followed to generate the set of query-to-query arcs $A_Q$.

Entity-to-query transitions. To extract entities from queries, the methodology described in the next section may be used. $X_E(q)$ denotes the set of entities extracted from a query q. The set of arcs $A_{EQ}$ are built by connecting each entity to all the queries that contain it:

$$A_{EQ} = \{e \rightarrow q \cdot s \cdot t \cdot e \in N_Q, e \in X_E(q)\}.$$

Any arc $e \rightarrow q \in A_{EQ}$ connecting an entity e to a query q is given a weight proportional to the relative frequency of the query q in the log L, with respect to all the queries that contain e. Formally, $$\omega_{\varepsilon Q}(e \rightarrow q) = \frac{f(q)}{\sum_{q_i | e \in X_\varepsilon(q_i)} f(q_i)},$$

where f(q) indicates the frequency of query q in the log L.

Entity-to-entity transitions. Arcs $A_E$ in connect only entity nodes, and their semantic is intended to be similar to that of arcs in $A_Q$.

The set of entity nodes $N_E$ includes the entities that are contained in the queries in log L. Thus, such entities represent individual concepts of interest, for which people have attempted to gather relevant information by submitting queries to the search engine. In general, an entity can be contained in many different queries, while most of the queries contain just one entity or no entity at all (due to the fact that average query length is very short).

An arc is drawn between two entities $e_i \rightarrow e_j \in A_E$ to indicate that there is high probability that a user who issued one or more queries related to the concept expressed by the first entity $e_i$, subsequently performs one or more searches related to the concept represented by the second entity $e_j$.

The set $A_E$ of entity-to-entity arcs starting from the set $A_Q$ of query-to-query arcs and from the set $A_{EQ}$ of the arcs that connect entities to queries is built. Given a single transition $q_i \rightarrow q_j \in A_Q$, consider the set of entities $X_E(q_i)$ extracted from the source query $q_i$, and the set of entities $X_E(q_j)$ extracted from the target query $q_j$. An arc is drawn from each entity extracted from the source query, to every entity extracted from the target query. In other words, from $q_i \rightarrow q_j$, a set of transitions $T_{q_i \rightarrow q_j} = \{e_u \rightarrow e_v | e_u \in X_E(q_i), e_v \in X_E(q_j)\}$ are derived.

Now let $w_Q(q_i \rightarrow q_j)$ be the weight (chaining probability) assigned to arc $q_i \rightarrow q_j$ in the model. With the aim of avoiding to excessively boost the weights assigned to arcs involving popular entities, which may be contained in many queries, the probability $w_Q(q_i \rightarrow q_j)$ is uniformly divided among the n·m entity-entity transitions derived from $q_i \rightarrow q_j$, thus every transition $e_u \rightarrow e_v \in T_{q_i \rightarrow q_j}$ is assigned a probability equal to $p_{q_i \rightarrow q_j}(e_u \rightarrow e_v) = w_Q(q_i \rightarrow q_j) / (n \cdot m)$.

Next, a given entity-to-entity transition $e_u \rightarrow e_v$ can be derived from multiple query-to-query transitions (the ones whose source query contains $e_u$ and whose target query contains $e_v$). Assume that there exist r query-to-query transitions $q_{i_s} \rightarrow q_{i_t}$, i=1, r in $A_Q$ that originate the entity-to-entity transition $e_u \rightarrow e_v$. Let us denote by $p_{q_{i_s} \rightarrow q_{i_t}}(e_u \rightarrow e_v)$, i=1, . . . , r, the probabilities assigned to transition $e_u \rightarrow e_v$ from each of the r originating $q_{i_s} \rightarrow q_{i_t}$ query-to-query transitions. These probabilities are aggregated to derive the global weight $w_E(e_u \rightarrow e_v)$ that is assigned to arc $e_u \rightarrow e_v$ in the EQGraph:

$$\omega_E(e_u \rightarrow e_v) = 1 - \prod_{i=1,\cdots,r} 1 - p_{q_{i_s} \rightarrow q_{i_t}}(e_u \rightarrow e_v))$$

Despite the fact that $A_Q$, which is constructed by following the Query-Flow graph model, does not contain self loops, the procedure for deriving $A_E$ transitions from $A_Q$ transitions may lead to the extraction of entity self loops, for example, in the case where the original query-to-query transition is a "specialization". A specialization is a query reformulation that a user submits when she realizes that her first query was too general given the information need that she had in mind. Thus, she formulates a second, more specific query in the attempt of getting a narrower set of results. Typically, the set of words of the specialized query is a superset of the set of words of the first query, thus the entities extracted from the first query are also likely to be extracted from the second query.

However, in one embodiment, entity self loops are not included in the EQGraph. The scenario for which the model is introduced is that of suggesting relevant queries for CC segments, based on the entities they contain. Further, the recommendation method exploits the entity-entity transitions to perform a preliminary expansion of the initial set of entities extracted from a text. A goal of this entity expansion is to overcome problems that might be encountered when the seed set of entities is particularly poor. In one embodiment, Personalized PageRank computations is performed on the subgraph of the EQGraph induced by the entity nodes, e.g., the subgraph that contains the entity nodes, and the arcs between them. In the computation of Personalized PageRank, self loops could have the effect of boosting the rank of nodes that might not be very close to the preference vector.

Figure 3:
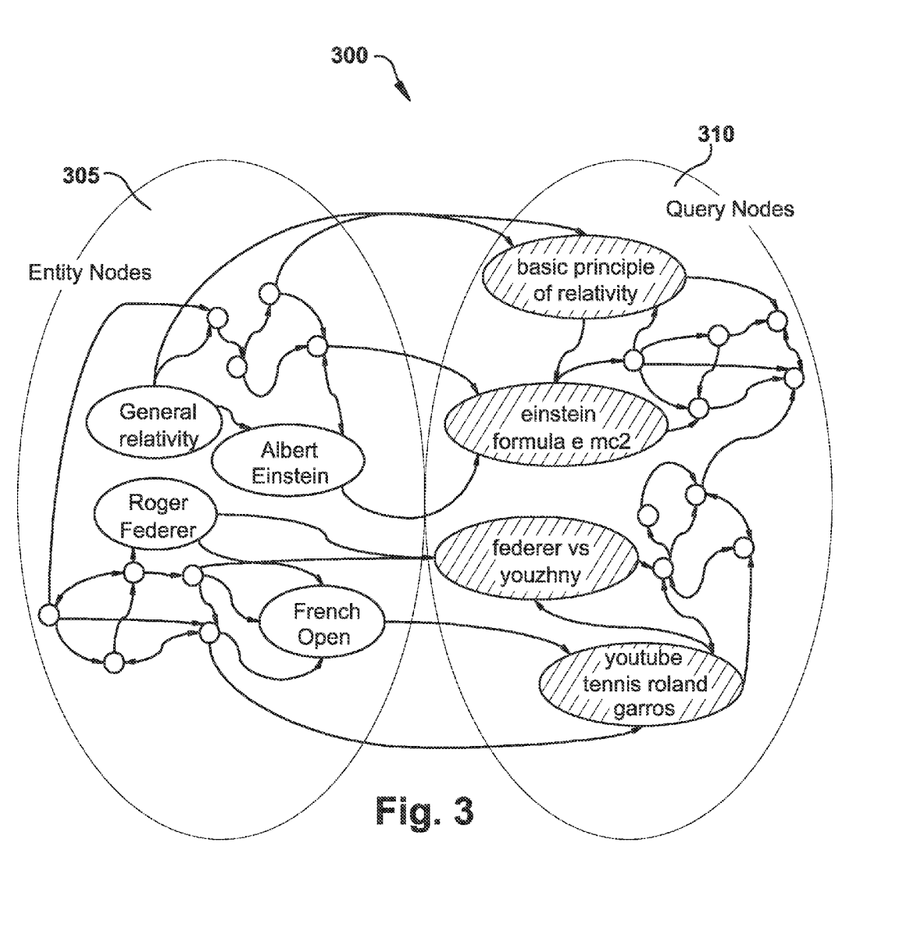
FIG. 3 is a flow diagram of an entity-query graph in accordance with an embodiment of the present disclosure.

FIG. 3 is a flow diagram of a depiction of an embodiment of an Entity-Query Graph 300. Entity-Query Graph 300 includes entity nodes 305 and query nodes 310. Entity nodes 305 include, for example, nodes for General relativity, Albert Einstein, Roger Federer, and French Open. Query nodes 310 include nodes for the basic principle of relativity, Einstein formula e=mc$^2$, Federer vs. Youzhny, and youtube tennis roland garros.

Recommendation Method

In one embodiment, the server 130 suggests to a given user who is watching a media program, whose current content is represented by a CC segment p, a ranked list Q of k queries such that q∈Q is related to p and non-obvious. The server 130 performs one or more of the following sub-tasks:

1. Segmenting the stream of closed captions into semantically coherent segments;
2. Extracting a seed set of entities $X_E(p)$ from p;
3. Expanding $X_E(p)$ to a larger set of entities $Z_E(p)$;
4. Obtain queries Q for the expanded set of entities.

Segmenting the stream of closed captions. Our input is the stream of closed captions broadcasted together with the TV content. Each line of CC is associated with a monotonically increasing timestamp that indicates the time it was aired. The segmentation problem consists of identifying segments of consecutive lines in the stream of closed captions that define a cohesive theme in the text. This can be thought of as identifying a set of points in time $(t_1, t_2)$ that bound the topic: $f_{seg}^D : C \rightarrow \{T \times T\}$. Note that these bounds implicitly define a sequence of CC lines: $S=\{(t_i, l_i) | t_1 \leq t_i < t_2\}$. The system is presented with a continuous stream of CC lines. Each line is added to a buffer B that is meant for building the query for the oracle $O_B$. Several strategies are available for managing B and thus implement $f_{seg}$.

One strategy is to use a windowed approach to build candidate segments. A given size for B can be fixed and the window can be moved along the stream C. In one embodiment, one of two different fixed-size variants of the windowing approach can be used: (i) a sliding window approach ($SW_\Gamma$), and (ii) a tumbling window approach ($TW_\Gamma$). The parameter Γ is the size of the window in seconds. $SW_\Gamma$ trims the oldest CC line from B when its size exceeds Γ, and therefore builds a new candidate segment of maximum duration Γ for each new CC line in the stream. $TW_\Gamma$ builds adjacent windows of fixed size Γ, that is, it proposes a new candidate segment and cleans B whenever adding a line to B would make it exceed Γ, and therefore proposes a candidate segment every Γ seconds at most.

Formally, the $f_{seg}$ functions implemented by the two windowing approaches are the following.

$$f\text{seg}(S;\Gamma)=sw_\Gamma=\{(t_i,t_j)|t_j-t_i=\Gamma\}$$

$$f\text{seg}(S;\Gamma)=Tw_\Gamma=\{(t_i,t_j)|t_i=k\cdot\Gamma, t_j=t_i+\Gamma, k\in N\}$$

The main motivations to choose these windowing approaches are that they are computationally inexpensive and relatively simple to implement. Furthermore, they perform well in practice.

Extracting Entities from Text.

To extract entities from a text, the text is parsed to identify surface forms (any mention of an entity in the text, e.g., tomatoes is a surface form of the entity Tomato) that are candidate mentions of Wikipedia entities. Entity candidates can be added to each recognized phrase by retrieving the candidates from an offline Wikipedia database.

To resolve each surface form to the correct Wikipedia entity, a machine-learning approach can be applied. For example, an approach can employ a resolution model based on a rich set of both context-sensitive and context-independent features, derived from Wikipedia and various other data sources including web behavioral data. An "aboutness" ranking model can then rank the obtained Wikipedia entities according to their relevance for the text. This model exploits structural and visual properties of web documents, as well as user feedback derived from search-engine click logs.

Expanding a List of Seed Entities.

Let p denote a CC segment for which the server 130 should recommend queries. In one embodiment, a Personalized PageRank computation is performed on the graph $G_E=(N_E, A_E)$, e.g., the subgraph of the EQGraph that contains the entities, and the arcs between them. A uniform distribution is then used on the seed set $X_E(p)$ as preference vector. An expanded set of entities denoted $Z_E(p)$ is built by taking the top entities with the highest scores in the resulting distribution.

Obtaining Queries for Entities.

Given the expanded set of entities $Z_E(p)$ obtained in the previous step, a list Q of k related queries can be created to recommend to the user. In one embodiment, the method is similar to the method considered for the entity expansion step. A Personalized PageRank computation is performed, but this time on the full EQGraph, by using a uniform distribution over the entities in $Z_E(p)$ as preference vector.

The k query nodes $\{q_1, q_2, \ldots, q_k\}$ that achieve the highest scores are returned in the resulting distribution.

System Description

Figure 4:
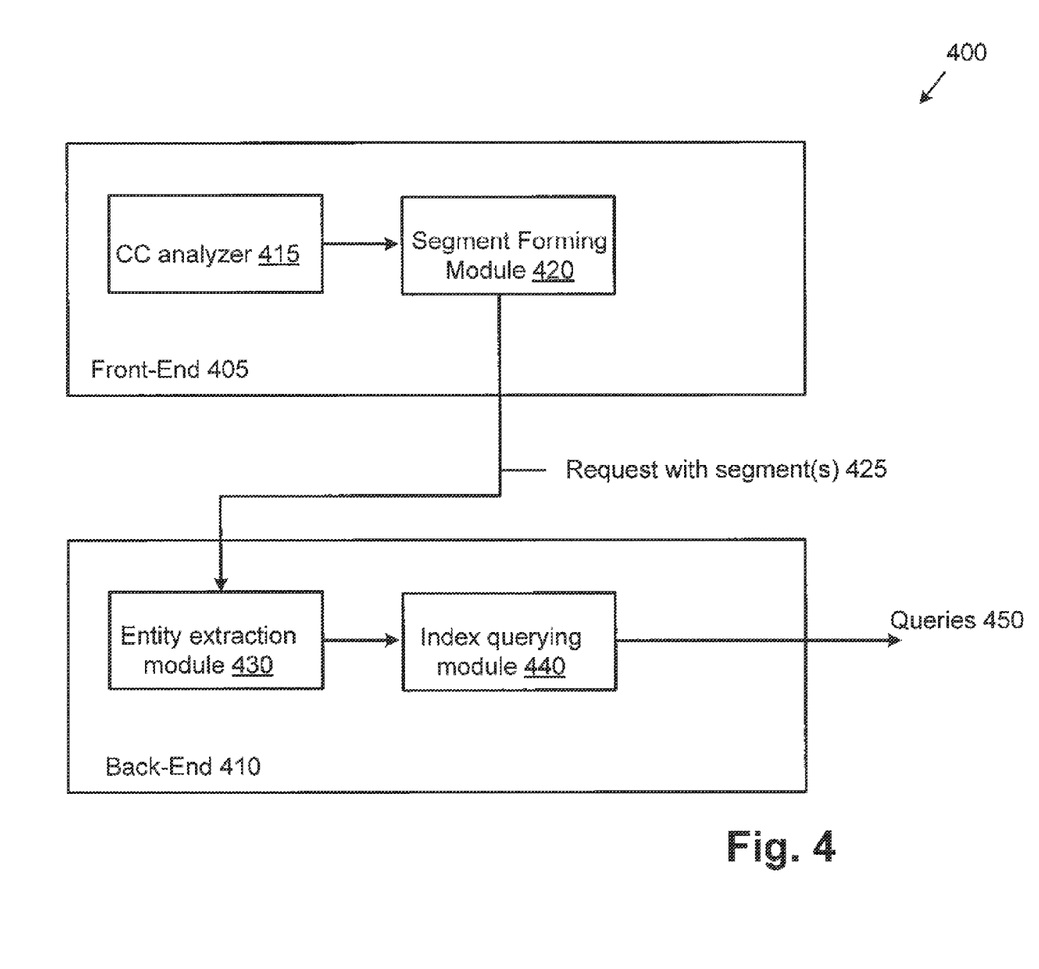
FIG. 4 is a block diagram including a front-end system in communication with a back-end system in accordance with an embodiment of the present disclosure.

In one embodiment and referring to FIG. 4, system 400 (e.g., server 130) can include two parts: a front-end 405 and a back-end 410. The back-end 410 performs an offline pre-computation of the distributions on the EQGraph, and stores them in an inverted index. The front-end 405 sends requests to the back-end and shows suggested queries to the user.

Workflow.

The workflow of the system 400 is as follows. The front-end includes a CC analyzer 415 for analyzing the stream of closed captions (e.g., in real-time or near real-time). The CC analyzer 415 sends this CC to a segment forming module 420, which divides the CC into semantically cohesive segments. The front-end 405 then sends a request 425 with the segment(s) representing the content currently on air to the back-end 410. An entity extraction module 430 of the back-end 410 receives the text and extracts relevant entities from the text. These entities constitute the seed set for the query suggestion. The entity extraction module 430 transmits this set to an index querying module 440 to query the precomputed index of distributions over the EQGraph. The index querying module 440 then sums the distributions to obtain the top-k queries 450 to suggest (e.g., to transmit to the client device 105). This operation is very similar to answering a query and can be implemented efficiently on the same infrastructure that a web search engine runs on.

Indexing.

The EQGraph can contain millions of entity nodes and hundreds of millions, or even billions, of query nodes. Even by compressing the lists the space required to store the full distribution is prohibitive. Thus, in one embodiment, the system uses approximate distributions. Approximation comes in two ways: pruning and bucketing.

Pruning.

By storing only the top-p probabilities for each entity, the space requirements are reduced from $|N_E| \times |N_Q|$ to $|N_E| \times p$.

The space saving depends on the condition $p \ll |N_Q|$. Some error in the query suggested may be introduced, but this error is less critical because Personalized PageRank is used (rather than, e.g., centerpiece computation). In Personalized PageRank, the final distribution is the sum of the single entity-specific distributions. Thus, even if one query is missing from the distribution of one of the entities in the seed, it can still be suggested if it is relevant enough to another entity in such set.

Bucketing.

Probabilities can be bucketed together by using buckets with exponentially increasing size. A single probability can be saved for the whole bucket, thus reducing the space occupancy. In one embodiment, error propagation is additive rather than multiplicative, so a better approximation results. Entity identifiers in the same bucket can be easily compressed by using gap coding and gamma coding or similar techniques.

Personalized PageRank in Giraph.

Given a weighted directed graph, Personalized PageRank is a measure of proximity or relevance of a node to a set of query nodes. To compute this measure on the EQGraph, Personalized PageRank can be implemented on Giraph. Giraph is an open-source large-scale graph-processing framework based on Hadoop. In one embodiment, it implements the "Bulk Synchronous Parallel" model of computation on graphs.

The implementation takes as input a directed graph, a restart probability and a preference vector defined on the nodes of the graph, and generates the stationary distribution of a random walker which restarts from a node in the graph according to the preference vector with probability $\alpha$.

The power iteration method can be used to compute the final distribution. In one embodiment, the restart probability is set to $\alpha=0.15$ and the number of iterations is set to 30.

In order to reduce the memory requirements of handling the EQGraph, a compact, array-based node representation can be implemented, which allows fast iteration over the arcs but makes random access expensive. This choice makes sense in the case of PageRank because at each step the server 130 iterates over the arcs of each node.

Figure 5:
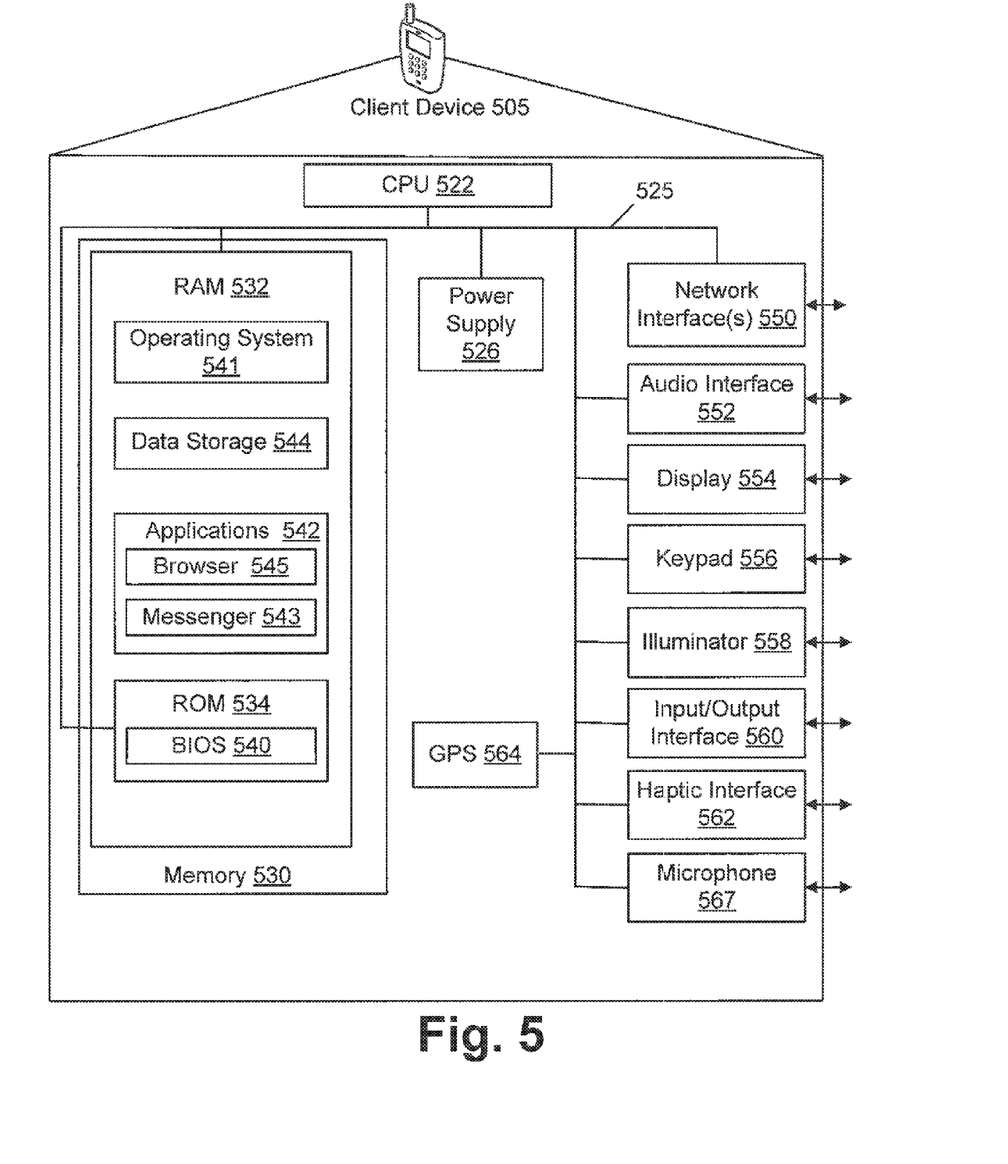
FIG. 5 depicts one example of a schematic diagram illustrating a client device in accordance with an embodiment of the present disclosure.

As shown in the example of FIG. 5, client device 505 may include one or more processing units (also referred to herein as CPUs) 522, which interface with at least one computer bus 525. A memory 530 can be persistent storage and interfaces with the computer bus 525. The memory 530 includes RAM 532 and ROM 534. ROM 534 includes a BIOS 540. Memory 530 interfaces with computer bus 525 so as to provide information stored in memory 530 to CPU 522 during execution of software programs such as an operating system 541, application programs 542, device drivers, and software modules 543, 545 that comprise program code, and/or computer-executable process steps, incorporating functionality described herein, e.g., one or more of process flows described herein. CPU 522 first loads computer-executable process steps from storage, e.g., memory 532, data storage medium/media 544, removable media drive, and/or other storage device. CPU 522 can then execute the stored process steps in order to execute the loaded computer-executable process steps. Stored data, e.g., data stored by a storage device, can be accessed by CPU 522 during the execution of computer-executable process steps.

Persistent storage medium/media 544 is a computer readable storage medium(s) that can be used to store software and data, e.g., an operating system and one or more application programs. Persistent storage medium/media 544 can also be used to store device drivers, such as one or more of a digital camera driver, monitor driver, printer driver, scanner driver, or other device drivers, web pages, content files, playlists and other files. Persistent storage medium/media 544 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Client device 505 can also include one or more of a power supply 526, network interface 550, audio interface 552, a display 554 (e.g., a monitor or screen), keypad 556, illuminator 558, I/O interface 560, a haptic interface 562, a GPS 564, a microphone 566, a video camera, TV/radio tuner, audio/video capture card, sound card, analog audio input with A/D converter, modem, digital media input (HDMI, optical link), digital I/O ports (RS232, USB, FireWire, Thunderbolt), expansion slots (PCMCIA, ExpressCard, PCI, PCIe).

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Figure 6:
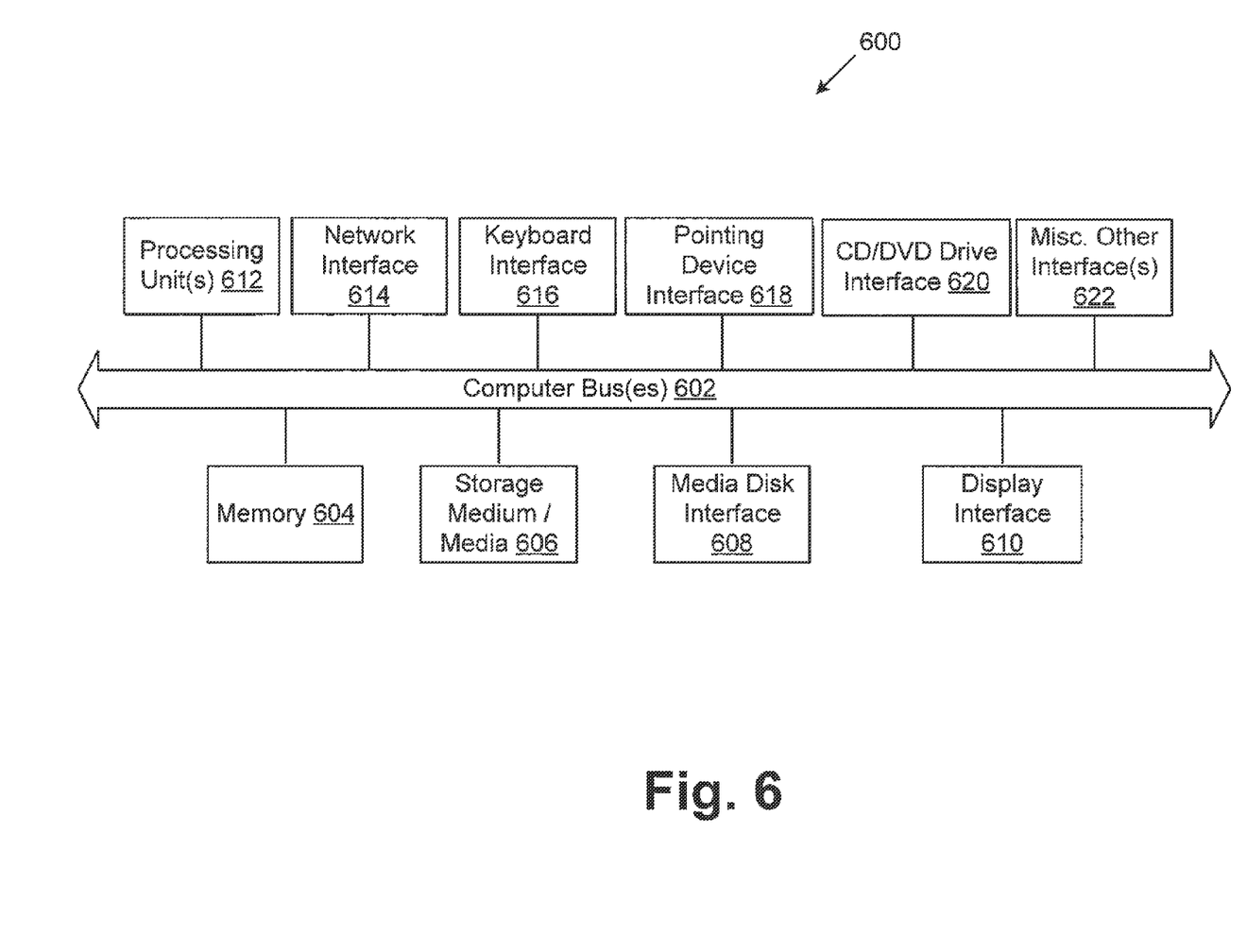
FIG. 6 is a block diagram illustrating an internal architecture of a computer in accordance with an embodiment of the present disclosure.

FIG. 6 is a block diagram illustrating an internal architecture of an example of a computer, such as server computer 130 and/or client device 105, in accordance with one or more embodiments of the present disclosure. A computer as referred to herein refers to any device with a processor capable of executing logic or coded instructions, and could be a server, personal computer, set top box, tablet, smart phone, pad computer or media device, to name a few such devices. As shown in the example of FIG. 6, internal architecture 600 includes one or more processing units (also referred to herein as CPUs) 612, which interface with at least one computer bus 602. Also interfacing with computer bus 602 are persistent storage medium/media 606, network interface 614, memory 604, e.g., random access memory (RAM), run-time transient memory, read only memory (ROM), etc., media disk drive interface 608 as an interface for a drive that can read and/or write to media including removable media such as floppy, CD-ROM, DVD, etc. media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces, a universal serial bus (USB) interface, and the like.

Memory 604 interfaces with computer bus 602 so as to provide information stored in memory 604 to CPU 612 during execution of software programs such as an operating system, application programs, device drivers, and software modules that comprise program code, and/or computer-executable process steps, incorporating functionality described herein, e.g., one or more of process flows described herein. CPU 612 first loads computer-executable process steps from storage, e.g., memory 604, storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

As described above, persistent storage medium/media 606 is a computer readable storage medium(s) that can be used to store software and data, e.g., an operating system and one or more application programs. Persistent storage medium/media 606 can also be used to store device drivers, such as one or more of a digital camera driver, monitor driver, printer driver, scanner driver, or other device drivers, web pages, content files, playlists and other files. Persistent storage medium/media 606 can further include program modules and data files used to implement one or more embodiments of the present disclosure.

Internal architecture 600 of the computer can include (as stated above), a microphone, video camera, TV/radio tuner, audio/video capture card, sound card, analog audio input with A/D converter, modem, digital media input (HDMI, optical link), digital I/O ports (RS232, USB, FireWire, Thunderbolt), and/or expansion slots (PCMCIA, ExpressCard, PCI, PCIe).

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the user computing device or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
   analyzing, by a server computer, closed captioning text associated with a media program being experienced in a time period by a user having a client device;
   in response to the analyzing of the closed captioning text, automatically extracting an entity from the closed captioning text by the server computer;
   determining, by the server computer, an online web page describing the entity;
   utilizing, by the server computer, a graph model to retrieve a relevant information item for the entity, the graph model comprising a plurality of entity nodes and a plurality of query nodes; and
   communicating, within the time period by the server computer, the relevant information item to the client device.

2. The method of claim 1, further comprising determining, by the server computer, a set of topics relating to the closed captioning text.

3. The method of claim 1, wherein the relevant information comprises relevant information from a group of relevant information types consisting of search queries, factoids, curiosities, quotes, facts, and questions and answers.

4. The method of claim 1, further comprising segmenting, by the server computer, the closed captioning text into a series of segments.

5. The method of claim 4, further comprising identifying segments of consecutive lines in the closed captioning text that define a theme in the text.

6. The method of claim 5, further comprising using, by the server computer, a sliding window approach to identify the segments.

7. The method of claim 5, further comprising using, by the server computer, a tumbling window approach to identify the segments.

8. The method of claim 1, wherein the utilizing of the graph model further comprises utilizing a graph representation of a query log.

9. The method of claim 1, wherein the graph model further comprises a graph comprising nodes and arcs, the nodes comprising Wikipedia entity nodes and query nodes and the arcs comprising entity-entity arcs, query-query arcs, and entity-query arcs.

10. A computing device comprising:
    a processor;
    a storage medium for tangibly storing thereon program logic for execution by the processor, the program logic comprising:
    analyzing logic executed by the processor for analyzing closed captioning text associated with a media program being experienced in a time period by a user having a client device;
    extracting logic executed by the processor for automatically extracting an entity from the closed captioning text;
    determining logic executed by the processor for determining an online web page describing the entity;
    utilizing logic executed by the processor for utilizing a graph model to retrieve a relevant information item for the entity, the graph model comprising a plurality of entity nodes and a plurality of query nodes; and
    communicating logic executed by the processor for communicating, within the time period, the relevant information item to the client device.

11. The computing device of claim 10, further comprising determining logic executed by the processor for determining a set of topics relating to the closed captioning text.

12. The computing device of claim 10, wherein the relevant information comprises relevant information from a group of relevant information types consisting of search queries, factoids, curiosities, quotes, facts, and questions and answers.

13. The computing device of claim 10, further comprising segmenting logic executed by the processor for segmenting the closed captioning text into a series of segments.

14. The computing device of claim 13, further comprising identifying logic executed by the processor for identifying segments of consecutive lines in the closed captioning text that define a theme in the text.

15. The computing device of claim 14, further comprising windowing logic executed by the processor for using a sliding window approach to identify the segments.

16. The computing device of claim 14, further comprising windowing logic executed by the processor for using a tumbling window approach to identify the segments.

17. The computing device of claim 10, wherein the utilizing logic further comprises utilizing logic for utilizing a graph representation of a query log.

18. The computing device of claim 10, wherein the graph model further comprises a graph comprising nodes and arcs, the nodes comprising Wikipedia entity nodes and query nodes and the arcs comprising entity-entity arcs, query-query arcs, and entity-query arcs.

19. A non-transitory computer readable storage medium tangibly storing computer program instructions capable of being executed by a computer processor, the computer program instructions defining the steps of:

analyzing, by the computer processor, closed captioning text associated with a media program being experienced in a time period by a user having a client device;

in response to the analyzing of the closed captioning text, automatically extracting, by the computer processor, an entity from the closed captioning text;

determining, by the computer processor, an online web page describing the entity;

utilizing, by the computer processor, a graph model to retrieve a relevant information item for the entity, the graph model comprising a plurality of entity nodes and a plurality of query nodes; and communicating, by the computer processor, the relevant information item to the client device.

* * * * *